Aug. 8, 1933. C. R. SYME 1,921,791
MEANS FOR ADJUSTING THE PLUNGERS OF MEASURING INSTRUMENTS
Filed Feb. 24, 1931

INVENTOR,
Charles R. Syme,
BY
Howard D. Smith
His ATTORNEY

Patented Aug. 8, 1933

1,921,791

UNITED STATES PATENT OFFICE

1,921,791

MEANS FOR ADJUSTING THE PLUNGERS OF MEASURING INSTRUMENTS

Charles R. Syme, Detroit, Mich., assignor to Louis F. Poock, Dayton, Ohio

Application February 24, 1931. Serial No. 517,766

6 Claims. (Cl. 33—147)

My invention relates to new and useful improvements in means for adjusting the plungers of measuring instruments.

It is the principal object of my invention to apply to the plunger of a measuring instrument, a simple adjusting means whereby it is possible easily and quickly to vary the length of the plunger within extremely close limits, at the same time eliminating back-lash and providing a mechanism for securely holding the adjustment as set without the disturbance usually caused by clamping or locking members.

It is another object of my invention to provide within the adjusting sleeve, a flat spring which will maintain the adjustment plunger in constant engagement with the operating plunger of the measuring instrument, at the same time eliminating the weight of both plungers from the work to be measured, thereby decreasing measuring pressure.

Other important and incidental objects will be brought out in the following specification and particularly set forth in the subjoined claims.

Figure 1:
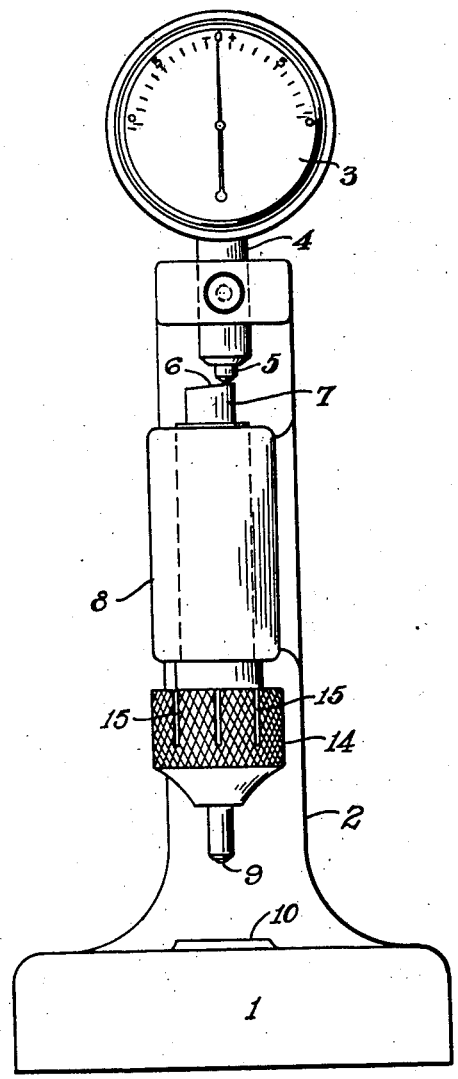
Figure 2:
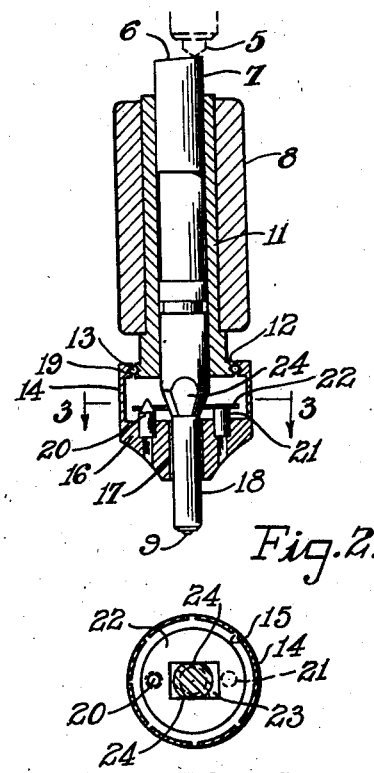
Figure 3:
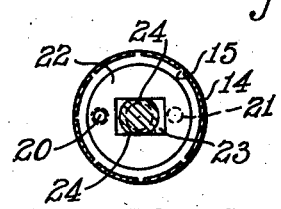

In the accompanying drawing illustrating my invention, Figure 1 is a front elevational view of a measuring instrument to which my plunger adjusting mechanism has been applied. Figure 2 is a longitudinal, sectional view taken through the adjusting sleeve and the plunger mechanism to which it is applied. And Figure 3 is a cross sectional view taken on the line 3—3 of Figure 2, showing the adjusting sleeve and the flat driving spring within it.

Referring to the accompanying drawing for a detailed description of my invention, the numeral 1 designates the base and 2 the column of a measuring instrument such as a dial indicator. A dial 3 is rigidly secured by its stem 4 to the top of the column 2.

Projecting downwardly through the stem 4 of the dial 3 for the purpose of operating the latter, is a plunger 5 which engages the cam surface 6 formed on the top face of an adjusting plunger 7. This plunger is free to move vertically through a hollow boss 8 on the middle front portion of the column 2. Secured to the lower end of the adjusting plunger 7 is a diamond contact point 9 for engagement with the work to be measured, upon the anvil 10.

For the purpose of setting the adjusting plunger 7 within extremely close limits, such as one one hundred thousandth of an inch or less, I provide the following mechanism. Fitted within the hollow boss 8 is a bushing 11 to receive the plunger 7. Formed on the lower end of this bushing is an annular flange 12 provided with a V groove in its periphery to receive a split ring 13 of round section. (See Figure 2.)

Adapted to be firmly connected to the flanged portion 12 of the bushing 11 by the ring 13, is a knurled spring sleeve 14. The latter is formed with equally spaced axial slots 15 extending inwardly a sufficient distance from its outer edge to give it the necessary spring tension. This sleeve has a bottom 16 formed with a round axial hole 17 through which the lower reduced end 18 of the plunger 7 projects without touching the sleeve.

The adjusting sleeve 14 is formed on its upper inner surface with an annular rib 19 that is provided with a V groove to firmly receive the split ring 13 carried by the bushing 11 when the upper part of the sleeve is snapped over it. This ring connection between the bushing and the sleeve is an easy, quick and positive one.

For the purpose of making the sleeve 14 a floating support for the plunger 7, as well as a positive drive for the latter, I provide the following means. Pressed in an axial counter-bored hole in the bottom 16 of the sleeve 14, is a conical stud 20. (See Figures 2 and 3.) Diametrically opposite this stud there is pressed into a counter-bored hole in the sleeve bottom 16 a cylindrical stop or rest 21 for a flat, disc spring 22 formed with a central, rectangular slot 23.

Opposite one end of this slot, on a diameter of the disc spring 22 that is at right angles to the ends of the slot, is an axial hole which fits the conical end of the stud 20. When this pin is in the hole just described in the disc spring 22, the diametrically opposite part of the latter will rest upon the stop 21 to hold the spring level so that it will be a true drive for the plunger 7.

The plunger 7 is formed at the lower end of its largest diameter with two oppositely-disposed flat faces 24, 24 tapered with an equal degree of angularity in relation to the central axis of the plunger. The flat disc spring 22 is so fitted to the plunger 7 that its two tapered faces 24, 24 are parallel to the major axis of the rectangular slot 23 through which it projects. This enables the disc spring to accommodate itself to the plunger along the line of the minor axis of the slot 23, for while the tapered faces 24, 24 of the plunger are engaged by the parallel sides of the rectangular slot 23 in the spring, the latter is free to move about the fixed conical stud 20 over the rest 21.

The disc spring 22 is also free to accommodate itself to the plunger along the line of the major axis of the slot 23, since there is sufficient clearance between the plunger and each end of the slot for this purpose. Thus, eccentricity of the assembly in any direction is cared for by this floating construction without affecting the positive drive which the spring sleeve 14 gives to the plunger 7.

The above described spring sleeve mechanism insures a positive drive of the plunger without looseness and with a minimum of measuring pressure. This is due to the fact that the flat spring 22 takes the load of the weight of the adjusting plunger 7 and associated measuring members.

The frictional resistance offered to the turning movement of the adjusting sleeve 14 by its inherent spring action against the split ring 13 and the bushing 11, prevents an accidental change of adjustment, while permitting an easy setting thereof by the pressure of two fingers.

It will now be seen that by turning the sleeve 14 in the desired direction, the plunger 7 will be rotated through the spring just described to raise or lower the indicating plunger 5, since the pointed end of the latter rests upon the top cam face 6 of the plunger 7, off center of the latter. An adjustment of this plunger may thus be obtained by my spring sleeve means, within extremely close limits, for example, within one one hundred thousandth of an inch or less. This adjustment may also be obtained quickly and easily after the diamond point 9 carried by the plunger 7 is in engagement with the work to be measured.

Having described my invention, I claim:

1. In a measuring instrument including an operating plunger, the combination of an adjustment plunger out of axial alinement with the operating plunger, means on the adjustment plunger for raising or lowering the operating plunger when the adjustment plunger is turned, an adjusting sleeve supporting the adjustment plunger, and a drive connection between the sleeve and adjustment plunger to turn it for a measuring adjustment within extremely close limits.

2. In a measuring instrument including an operating plunger, the combination of an adjustment plunger out of axial alinement with the operating plunger, mean on the adjustment plunger for raising or lowering the operating plunger when the adjustment plunger is turned, an adjusting sleeve supporting the adjustment plunger, and a flat spring pivotally secured within the sleeve to turn the adjustment plunger for a measuring adjustment within extremely close limits.

3. In a measuring instrument including an operating plunger, the combination of an adjustment plunger, an adjusting sleeve supporting the adjustment plunger, the latter being formed with two oppositely disposed flat, tapered faces, and a flat spring pivotally secured within the sleeve, said spring having a rectangular slot to fit the tapered portion of the adjustment plunger, the tapered faces of the latter being parallel with the major axis of the slot.

4. In a measuring instrument including an operating plunger, the combination of an adjustment plunger out of axial alinement with the operating plunger, means on the adjustment plunger for raising or lowering the operating plunger when the adjustment plunger is turned, a hollow boss on the measuring instrument below the operating plunger, a bushing in said boss, for the adjustment plunger, a flange on the lower end of the bushing, and a positive drive sleeve carrying the adjustment plunger, said sleeve having an expansible outer end for a spring-tension connection with the flange on the bushing to hold the plunger adjustment without distortion due to clamping members.

5. In a measuring instrument including an operating plunger, the combination of an adjustment plunger out of axial alinement with the operating plunger, means on the adjusting plunger for raising or lowering the operating plunger when the adjustment plunger is turned, a hollow boss on the measuring instrument below the operating plunger, a bushing in said boss, for the adjustment plunger, a flange on the lower end of the bushing, having a V-groove, a split ring in said groove, and a positive drive sleeve carrying the adjustment plunger, said sleeve having an axially split outer end formed with an internal V-groove to fit said ring to hold the plunger adjustment without distortion due to clamping members.

6. In a measuring instrument including an operating plunger, the combination of an adjustment plunger out of axial alinement with the operating plunger, means on the adjustment plunger for raising or lowering the operating plunger when the adjustment plunger is turned, a sleeve surrounding the lower end of the adjustment plunger, the latter having two oppositely disposed flat tapered faces within said sleeve, a bottom for the sleeve formed with an axial hole through which the adjustment plunger projects without touching the sleeve, a conical stud projecting axially upward from the sleeve bottom, a rest member also projecting upwardly from the sleeve bottom diametrically opposite the conical stud, a flat disc spring having a hole to fit said conical stud and a rectangular slot whose major axis is parallel with the diameter on which the stud and rest member are located, said slot being adapted to fit the tapered faces of the adjustment plunger, which are also parallel with its major axis, said spring disc being free to float on the rest member around the conical stud to care for the eccentricity of the assembly in any direction.

CHARLES R. SYME.